United States Patent
Xu et al.

(10) Patent No.: US 10,988,687 B2
(45) Date of Patent: Apr. 27, 2021

(54) PHTHALOCYANINE FORMULATION AND USES THEREOF

(71) Applicant: LI-COR, INC., Lincoln, NE (US)

(72) Inventors: Xinshe Xu, Lincoln, NE (US); Rose Skopp, Lincoln, NE (US); Mark Cradduck, Lincoln, NE (US); Nisha Padhye, Lincoln, NE (US)

(73) Assignee: LI-COR, INC., Lincoln, NE (US)

( * ) Notice: Subject to any disclaimer, the term of this patent is extended or adjusted under 35 U.S.C. 154(b) by 0 days.

(21) Appl. No.: 15/825,339

(22) Filed: Nov. 29, 2017

(65) Prior Publication Data

US 2018/0079954 A1    Mar. 22, 2018

Related U.S. Application Data

(62) Division of application No. 14/262,659, filed on Apr. 25, 2014, now Pat. No. 9,845,430.

(60) Provisional application No. 61/955,743, filed on Mar. 19, 2014.

(51) Int. Cl.
  *C09K 11/07*    (2006.01)
  *F21K 2/06*     (2006.01)
  *B43K 1/12*     (2006.01)

(52) U.S. Cl.
  CPC ........... *C09K 11/07* (2013.01); *B43K 1/12* (2013.01); *F21K 2/06* (2013.01); *C09K 2211/1029* (2013.01); *C09K 2211/188* (2013.01)

(58) Field of Classification Search
  CPC ........................................... C09K 11/06
  See application file for complete search history.

(56) References Cited

U.S. PATENT DOCUMENTS

| 3,816,548 A | | 6/1974 | Williams et al. | |
|---|---|---|---|---|
| 4,248,636 A | * | 2/1981 | Sasaki | C09D 11/36 106/31.28 |
| 4,632,703 A | * | 12/1986 | Koike | C09B 47/24 106/31.46 |
| 5,543,177 A | * | 8/1996 | Morrison | G03G 9/08 101/491 |
| 6,043,428 A | | 3/2000 | Han et al. | |
| 9,845,430 B2 | | 12/2017 | Xu et al. | |
| 2003/0041775 A1 | | 3/2003 | Deardurff et al. | |

(Continued)

FOREIGN PATENT DOCUMENTS

| JP | H07103336 B2 * | 11/1995 |
| KR | 101225315 | 1/2013 |
| WO | 2012042264 | 4/2012 |

OTHER PUBLICATIONS

English machine translation of Arisawa et al., JP H07-103336 (Year: 1995).*

(Continued)

*Primary Examiner* — Peter F Godenschwager
(74) *Attorney, Agent, or Firm* — Kilpatrick Townsend & Stockton LLP

(57) ABSTRACT

The present invention provides a chemiluminescent ink formulation, comprising: a phthalocyanine metal catalyst; a visible dye; and a solvent. The formulation is useful in catalyzing a chemiluminescent reaction, by admixing for example, luminol or isoluminol with an oxidizing agent, a base and the chemiluminescent ink formulation to emit light.

14 Claims, 9 Drawing Sheets

(56) References Cited

U.S. PATENT DOCUMENTS

2003/0177947 A1* 9/2003 Ikoma .................. C09D 11/17
106/31.78
2003/0224494 A1 12/2003 Nomoto et al.
2006/0201387 A1 9/2006 Patel et al.
2007/0179285 A1 8/2007 Berneth et al.

OTHER PUBLICATIONS

Declaration Under 37 CFR § 1.130(a) filed in parent application (U.S. Appl. No. 14/262,659) on Jul. 12, 2016.
Advansta WesternBright ChemiPen, "WesternBright ChemiPen." Retrieved on Sep. 21, 2015, from http://advansta.com/WesternBright_ChemiPen, 2 pages.
Li-Cor, Li-Cor Launches Pen for Protein Ladder Annotation, www.licor.com/bio/news/2.13.14.html, Feb. 13, 2014, Lincoln Nebraska, USA, 2 pages.
Sigma-Aldrich, "Glow Writer autoradiography pen," retrieved on Sep. 21, 2015 from http://www.sigmaaldrich.com/catalog/product/sigma/z7387191ang=en®ion=US, 2 pages.

\* cited by examiner

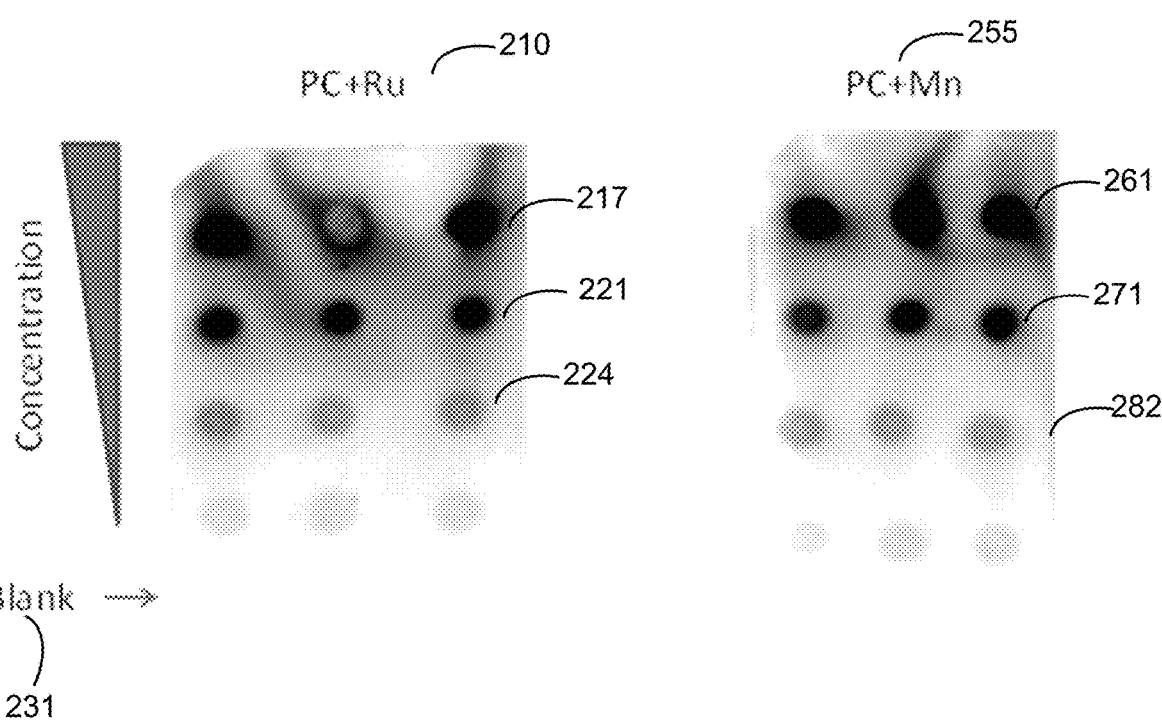
*FIG. 2A*   *FIG. 2B*

180
80
53
40
32  XX
24  9/19/12
18
14
65  Exp 4

LI-COR

1 Avantsa Pen (Heavy)
2. Avantsa Pen (Light)
3. Inventive Pen (Heavy)
4. Inventive Pen (Light)

5 Avantsa Pen (Heavy)
6. Avantsa Pen (Light)
7. Inventive Pen (Heavy)
8. Inventive Pen (Light)

1. Avantsa Pen (Heavy)
2. Avantsa Pen (Light)
3. Inventive Pen (Heavy)
4. Inventive Pen (Light)

5. Avantsa Pen (Heavy)
6. Avantsa Pen (Light)
7. Inventive Pen (Heavy)
8. Inventive Pen (Light)

PHTHALOCYANINE FORMULATION AND USES THEREOF

CROSS-REFERENCE TO RELATED APPLICATIONS

The present application is a Divisional of U.S. patent application Ser. No. 14/262,659 filed Apr. 25, 2014 (Allowed); which claims the benefit of U.S. Provisional Appln. No. 61/955,743 filed Mar. 19, 2014, the disclosures which are hereby incorporated by reference in their entirety for all purposes.

FIELD OF THE INVENTION

This invention relates to a phthalocyanine metal catalyst formulation that is useful for a pen for marking on membranes (for example, the molecular weight) such as nitrocellulose, PVDF and other membranes.

BACKGROUND OF THE INVENTION

Western blotting is a very useful and common laboratory procedure. In the typical procedure, protein mixtures are separated on polyacrylamide gel into bands using an applied electric field. After the proteins are separated into bands, the separated bands are transferred to a membrane. After transfer, the separated proteins are probed with primary and secondary antibodies for detection. The detection can be accomplished via radioactivity, chemiluminescence, fluorescence, or absorbance. The most common detection method is chemiluminescence; however, in order to detect multiple analytes simultaneously, fluorescence has recently gained popularity.

After the separated protein bands are transferred to a membrane, it is often useful to show the separated bands, or to provide orientation or other experimental information from the membrane. Annotation and/or marking the position of protein standards for a Western blot membrane is typically done using a Sharpie® or other indelible fine tip felt pen. The film is overlaid and aligned atop the membrane and standard positions such as a protein ladder are noted on the film. With the use of imagers as a replacement to film, a need to mark the membrane directly is needed. Currently, other technologies for marking Western blot membranes utilize phosphorescent (Glow Writer®) or luminescent pens (Advansta®). Due to the various wash steps, it is often difficult to find suitable types of ink that will withstand the harsh wash steps.

In view of the foregoing, there is a need in the art for a pen to mark membranes and other solid surfaces which will be exposed to biological or chemical substrates and procedures. The present invention satisfies this and other needs.

BRIEF SUMMARY OF THE INVENTION

In one embodiment, the present invention provides a chemiluminescent ink formulation, the chemiluminescent ink formulation comprising:

a phthalocyanine metal catalyst;

optionally a visible dye; and a solvent.

In certain instances, the phthalocyanine metal catalyst has Formula I:

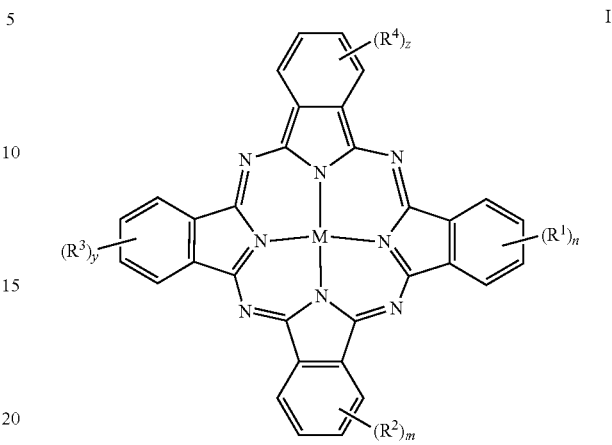

In Formula I, M is a member selected from the group consisting of Ni, Mn, Fe, Co, and Ru. In certain aspects, Mn and Ru are preferred metals of the phthalocyanine metal catalyst of the present invention.

In Formula I, $R^1$, $R^2$, $R^3$ and $R^4$ are each independently selected from the group consisting of hydrogen, amino, amido, alkyl, alkenyl, alkoxy, carboxyl, cyano, halo, hydroxyl, sulfonato, phospho, hydroxyalkyl, alkoxyalkyl, aminoalkyl, amidoalkyl, alkylthioalkyl, carboxyalkyl, alkoxycarbonylalkyl, sulfonatoalkyl, alkoxycarbonyl, alkoxyalkyl, a sugar residue, a polysaccharide residue, and a PEG; and m, y, z and n are each independently selected from the group consisting of 0, 1, 2, 3 and 4.

In another embodiment, the present invention provides a chemiluminescent pen, the chemiluminescent pen comprising:

a barrel comprising a reservoir for holding a chemiluminescent ink formulation; and a nib.

In yet another embodiment, the present invention provides a method for catalyzing a chemiluminescent reaction, the method comprising:

admixing luminol, isoluminol or a luminol derivative with an oxidizing agent, a base and a chemiluminescent ink formulation to catalyze a chemiluminescent reaction and emit light.

These and other aspects, objects and advantages will become more apparent when read with the drawings and detailed description which follow.

BRIEF DESCRIPTION OF THE DRAWINGS

FIGS. 2A-2B illustrate the use of an embodiment of the present invention. FIG. 2A shows the use of a ruthenium phthalocyanine metal catalyst. FIG. 2B shows the use of a manganese phthalocyanine metal catalyst.

FIG. 3A shows the imaging of a ruthenium phthalocyanine metal catalyst side-by-side with a manganese phthalocyanine metal catalyst on a small imager. Images were acquired immediately after incubation with substrate on a LI-COR Odyssey® Fc at 2 min exposure. FIG. 3B shows the imaging of a ruthenium phthalocyanine metal catalyst side-by-side with manganese phthalocyanine metal catalyst on an C-DiGit imager.

FIGS. 5A and 5C illustrate the use with a first chemiluminescent substrate and FIGS. 5B and 5D illustrate the use of a second chemiluminescent substrate.

FIG. 6 shows a pattern similar to that of a pre-stained protein molecular weight ladder marked on a membrane.

FIG. 7A shows markings with the Advansta ChemiPen (lanes 1 and 2, from left to right) and with an inventive chemiluminescent Pen (lanes 3 and 4, from left to right) on the semi-dry PVDF membrane. FIG. 7B shows markings with the Advansta ChemiPen (lanes 5 and 6, from left to right) and with an inventive chemiluminescent Pen (lanes 7 and 8, from left to right) on the dry PVDF membrane. FIGS. 7C-7D show the use on nitrocellulose membrane.

DETAILED DESCRIPTION

I. Definitions

Figure 1:
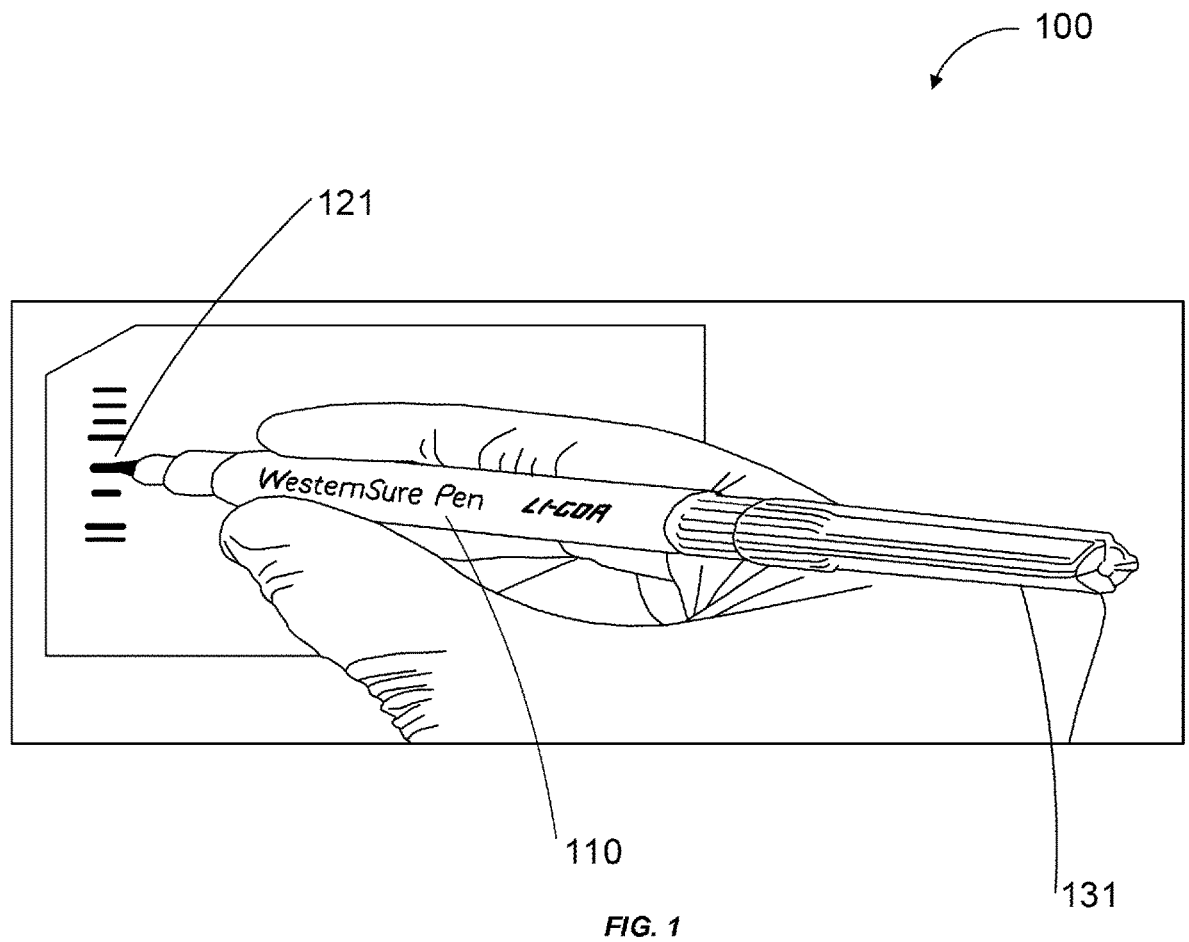
FIG. 1 illustrates a pen embodiment of the present invention.

The terms "a," "an," or "the" as used herein not only include aspects with one member, but also include aspects with more than one member. For example, an embodiment of a method of imaging that comprises using a compound set forth in claim 1 would include an aspect in which the method comprises using two or more compounds set forth in claim 1.

The term "about" as used herein to modify a numerical value indicates a defined range around that value. If "X" were the value, "about X" would indicate a value from 0.9X to 1.1X, and more preferably, a value from 0.95X to 1.05X. Any reference to "about X" specifically indicates at least the values X, 0.95X, 0.96X, 0.97X, 0.98X, 0.99X, 1.01X, 1.02X, 1.03X, 1.04X, and 1.05X. Thus, "about X" is intended to teach and provide written description support for a claim limitation of, e.g., "0.98X."

When the quantity "X" only allows whole-integer values (e.g., "X carbons") and X is at most 15, "about X" indicates from (X−1) to (X+1). In this case, "about X" as used herein specifically indicates at least the values X, X−1, and X+1. If X is at least 16, the values of 0.90X and 1.10X are rounded to the nearest whole-integer values to define the boundaries of the range.

When the modifier "about" is applied to describe the beginning of a numerical range, it applies to both ends of the range. Thus, "from about 700 to 850 nm" is equivalent to "from about 700 nm to about 850 nm." When "about" is applied to describe the first value of a set of values, it applies to all values in that set. Thus, "about 680, 700, or 750 nm" is equivalent to "about 680 nm, about 700 nm, or about 750 nm." However, when the modifier "about" is applied to describe only the end of the range or only a later value in the set of values, it applies only to that value or that end of the range. Thus, the range "about 2 to about 10" is the same as "about 2 to about 10," but the range "2 to about 10" is not.

"Alkanoyl" as used herein includes an alkyl-C(O)— group wherein the alkyl group is as defined herein. Representative alkanoyl groups include acetyl, ethanoyl, and the like.

"Alkenyl" as used herein includes a straight or branched aliphatic hydrocarbon group of 2 to about 15 carbon atoms that contains at least one carbon-carbon double bond. Preferred alkenyl groups have 2 to about 12 carbon atoms. More preferred alkenyl groups contain 2 to about 6 carbon atoms. "Lower alkenyl" as used herein includes alkenyl of 2 to about 6 carbon atoms. Representative alkenyl groups include vinyl, allyl, n-butenyl, 2-butenyl, 3-methylbutenyl, n-pentenyl, heptenyl, octenyl, decenyl, and the like.

"Alkoxy" as used herein includes an alkyl-O— group wherein the alkyl group is as defined herein. Representative alkoxy groups include methoxy, ethoxy, n-propoxy, i-propoxy, n-butoxy, heptoxy, and the like.

"Alkoxyalkyl" as used herein includes an alkyl-O-alkylene- group wherein alkyl and alkylene are as defined herein. Representative alkoxyalkyl groups include methoxyethyl, ethoxymethyl, n-butoxymethyl and cyclopentylmethyloxyethyl.

"Alkoxycarbonyl" as used herein includes an ester group; i.e., an alkyl-O—CO— group wherein alkyl is as defined herein. Representative alkoxycarbonyl groups include methoxycarbonyl, ethoxycarbonyl, t-butyloxycarbonyl, and the like.

"Alkoxycarbonylalkyl" as used herein includes an alkyl-O—CO-alkylene- group wherein alkyl and alkylene are as defined herein. Representative alkoxycarbonylalkyl include methoxycarbonylmethyl, ethoxycarbonylmethyl, methoxycarbonylethyl, and the like.

"Alkyl" as used herein includes an aliphatic hydrocarbon group, which may be straight or branched-chain, having about 1 to about 20 carbon atoms in the chain. Preferred alkyl groups have 1 to about 12 carbon atoms in the chain. More preferred alkyl groups have 1 to 10 or 1 to 6 carbon atoms in the chain. "Branched-chain" as used herein includes that one or more lower alkyl groups such as methyl, ethyl or propyl are attached to a linear alkyl chain. "Lower alkyl" as used herein includes 1 to about 6 carbon atoms, preferably 5 or 6 carbon atoms in the chain, which may be straight or branched. Representative alkyl groups include methyl, ethyl, n-propyl, isopropyl, n-butyl, t-butyl, n-pentyl, and 3-pentyl.

"Alkylsulfonate ester" as used herein includes an alkyl-SO₃— group wherein the alkyl group is as defined herein. Preferred alkylsulfonate ester groups are those wherein the alkyl group is lower alkyl. Representative alkylsulfonate ester groups include mesylate ester (i.e., methylsulfonate ester).

An "optionally substituted" alkylsulfonate ester includes an alkylsulfonate ester as defined herein, wherein the aryl group is additionally substituted with from 0 to 3 halo, alkyl, aryl, haloalkyl, or haloaryl groups as defined herein. Preferred optionally substituted alkylsulfonate groups include triflate ester (i.e., trifluoromethylsulfonate ester).

"Alkylthio" as used herein includes an alkyl-S— group wherein the alkyl group is as defined herein. Preferred alkylthio groups are those wherein the alkyl group is lower alkyl. Representative alkylthio groups include methylthio, ethylthio, isopropylthio, heptylthio, and the like.

"Alkylthioalkyl" as used herein includes an alkylthioalkylene- group wherein alkylthio and alkylene are defined herein. Representative alkylthioalkyl groups include methylthiomethyl, ethylthiopropyl, isopropylthioethyl, and the like.

"Amido" as used herein includes a group of formula $Y_1Y_2N$—C(O)— wherein $Y_1$ and $Y_2$ are independently hydrogen, alkyl, or alkenyl; or $Y_1$ and $Y_2$, together with the nitrogen through which $Y_1$ and $Y_2$ are linked, join to form a 4- to 7-membered azaheterocyclyl group (e.g., piperidinyl). Representative amido groups include primary amido ($H_2N$—C(O)—), methylamido, dimethylamido, diethylamido, and the like. Preferably, "amido" is an —C(O)NRR' group where R and R' are members independently selected from the group consisting of H and alkyl. More preferably, at least one of R and R' is H.

"Amidoalkyl" as used herein includes an amido-alkylene- group wherein amido and alkylene are defined herein. Representative amidoalkyl groups include amidomethyl, amidoethyl, dimethylamidomethyl, and the like.

"Amino" as used herein includes a group of formula $Y_1Y_2N$— wherein $Y_1$ and $Y_2$ are independently hydrogen, acyl, aryl, or alkyl; or $Y_1$ and $Y_2$, together with the nitrogen through which $Y_1$ and $Y_2$ are linked, join to form a 4- to 7-membered azaheterocyclyl group (e.g., piperidinyl). Optionally, when $Y_1$ and $Y_2$ are independently hydrogen or alkyl, an additional substituent can be added to the nitrogen, making a quaternary ammonium ion. Representative amino groups include primary amino ($H_2N$—), methylamino, dimethylamino, diethylamino, tritylamino, and the like. Preferably, "amino" is an —NRR' group where R and R' are members independently selected from the group consisting of H and alkyl. Preferably, at least one of R and R' is H.

"Aminoalkyl" as used herein includes an amino-alkylene- group wherein amino and alkylene are defined herein. Representative aminoalkyl groups include aminomethyl, aminoethyl, dimethylaminomethyl, and the like.

An "optionally substituted" arylsulfonate ester includes an arylsulfonate ester as defined herein, wherein the aryl group is additionally substituted with from 0 to 3 halo, alkyl, aryl, haloalkyl, or haloaryl groups as defined herein. Preferred optionally substituted arylsulfonate esters include tosylate ester (i.e., p-tolylsulfonate ester).

"Carboxy" and "carboxyl" as used herein include a HOC(O)— group (i.e., a carboxylic acid) or a salt thereof.

"Carboxyalkyl" as used herein includes a HOC(O)-alkylene- group wherein alkylene is defined herein. Representative carboxyalkyls include carboxymethyl (i.e., HOC(O)$CH_2$—) and carboxyethyl (i.e., HOC(O)$CH_2CH_2$—).

"Halo" or "halogen" as used herein include fluoro, chloro, bromo, or iodo.

"Hydroxyalkyl" as used herein includes an alkyl group as defined herein substituted with one or more hydroxy groups. Preferred hydroxyalkyls contain lower alkyl. Representative hydroxyalkyl groups include hydroxymethyl and 2-hydroxyethyl.

"Luminol derivative" as used herein includes an oxidizable substrate such as 2,3-dihydro-1,4-phthalazinedione, chemiluminescent cyclic diacylhydrazide, hydroxyaryl cyclic diacylhydrazides and aminoaryl cyclic diacylhydrazides. For example, the compound o-aminophthalhydrazide-N-acetyl-β-D-glucosaminide (luminol-NAG) and 4'-(6'-diethylaminobenzofuranyl)phthalhydrazide-N-acetyl-β-D-glucosaminide serve as a masked form of luminol.

"Membrane" as used herein includes the transfer "substrate" to collect proteins in a Western Blot. After gel electrophoresis, proteins are transferred to a membrane such as nitrocellulose or PVDF, where they are stained with antibodies specific to the target protein.

"PEG" as used herein includes polyethyleneoxide (PEO) polymers as substituents for the phthalocyanine metal catalyst. Typical PEO molecular weights include 300 to about 5000.

"Sulfonato" as used herein includes an —$SO_3^-$ group, preferably balanced by a cation such as $H^+$, $Na^+$, $K^+$, ammonium ($NH_4^+$), quaternary ammonium ($NR_4^+$), wherein each R may be the same or different and is alkyl or aryl, and the like.

"Sulfonatoalkyl" as used herein includes a sulfonato-alkylene- group wherein sulfonato and alkylene are as defined herein. A more preferred embodiment includes alkylene groups having from 2 to 6 carbon atoms, and a most preferred embodiment includes alkylene groups having 2, 3, or 4 carbons. Representative sulfonatoalkyls include sulfonatomethyl, 3-sulfonatopropyl, 4-sulfonatobutyl, 5-sulfonatopentyl, 6-sulfonatohexyl, and the like.

"Sugar residue" or "polysaccharide residue" as used herein includes a sugar substituent for attachment to the phthalocyanine metal catalyst. Monosaccharaides include pentoses such as ribose, xylose and arabinose and hexoses such as glucose, galactose, mannose, idose and gulose. Other mono- and disaccharides such as fructose and sucrose are also sugar residues. A polysaccharide residue includes dextrans and celluloses. The residue is the sugar without a hydrogen attached to an oxygen. The oxygen such as the anomeric oxygen, is the point of attachment to the phthalocyanine metal catalyst.

II. Embodiments

The present invention provides a composition comprising a catalytic reagent that functions like a peroxidase, such as horseradish peroxidase (HRP), cytochrome C, or the like. The composition comprising a catalytic reagent produces chemiluminescent light when exposed to a chemiluminescent substrate. In certain instances, the composition comprises at least one visible dye. The visible dye allows for ease of identification of the target such as in an annotated or marked surface. After marking the surface, the visible dye allows for the target identification prior to, or after exposure to a chemiluminescent substrate.

As such, in one embodiment, the present invention provides a chemiluminescent ink formulation, the chemiluminescent ink formulation comprising:

a phthalocyanine metal catalyst;

optionally a visible dye; and a solvent.

In certain instances, the phthalocyanine metal catalyst has Formula I:

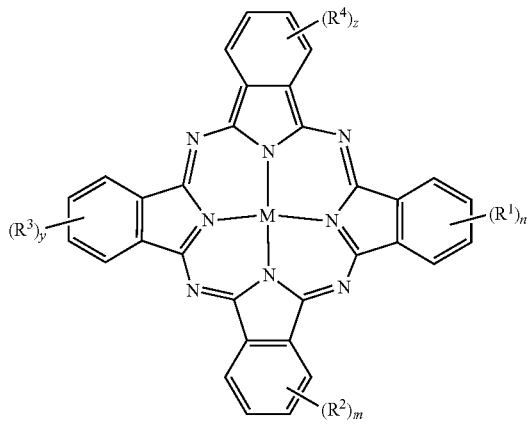

In Formula I, M is a member selected from the group consisting of Ni, Mn, Fe, Co, and Ru. In certain aspects, Mn and Ru are preferred metals for the phthalocyanine metal catalyst of the present invention.

In Formula I, $R^1$, $R^2$, $R^3$ and $R^4$ are each independently selected from the group consisting of hydrogen, amino, amido, alkyl, alkenyl, alkoxy, carboxyl, cyano, halo, hydroxyl, sulfonato, phospho, hydroxyalkyl, alkoxyalkyl, aminoalkyl, amidoalkyl, alkylthioalkyl, carboxyalkyl, alkoxycarbonylalkyl, sulfonatoalkyl, alkoxycarbonyl, alkoxyalkyl, a sugar residue, a polysaccharide residue, and a PEG; and m, y, z and n are each independently selected from the group consisting of 0, 1, 2, 3 and 4.

In one aspect, $R^1$, $R^2$, $R^3$ and $R^4$ are each independently hydrogen or alkoxy. In one aspect, $R^1$, $R^2$, $R^3$ and $R^4$ are each independently alkoxy and m, y, z and n are each 2. In one aspect, the alkoxy group is a $C_1$-$C_6$ alkoxy such as $C_1$, $C_2$, $C_3$, $C_4$, $C_5$ or $C_6$ alkoxy (e.g. propoxy, butoxy, or pentoxy group).

In certain instances, phththalocyanine dyes and their metal complexes have limited solubility in solvents. However, various substituents at $R^1$, $R^2$, $R^3$, and $R^4$, can improve the dye's solubility in a solvent or solution as these substitutions can reduce aggregation.

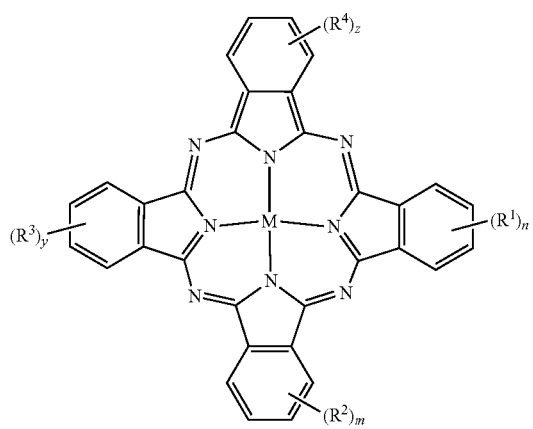

The metal can be inserted into the core during the synthesis or inserted after the dye formation. In either case, the metal complexes have similar catalytic activity.

To provide visible orientation and confirmation that the catalyst has been applied, a visible dye is optionally included in the chemiluminescent "ink" formulation. The inclusion of a visible dye is advantageous, but not required for an application using the chemiluminescent ink formulation. Suitable visible dyes that can be used include, but are not limited to, the dyes listed in Table 1. A preferred dye is Nile Blue A such as Nile Blue A perchlorate, which is especially suitable.

TABLE 1

Preferred Visible Dye for use in the Chemiluminescent pen.

| Visible Dye | Source | Cat. No. | Ink Solvent Mix BA:Toluene:IPA (%) |
|---|---|---|---|
| Solvent Green | Aldrich | 211982 | 0:50:50 |
| Sudan Blue | Aldrich | 306436 | 0:30:70 |
| Safranin | Sigma | S884 | 0:30:70 |
| 1-(methylamino) anthraquinone | Sigma | M28200-5G | 20:0:80 |
| | | | 15:15:70 |
| | | | 10:20:70 |
| | | | 100:0:0 |
| | | | 100:0:0 |
| | | | 100:0:0 |
| | | | 100:0:0 |
| | | | 30:0:70 |
| OBPC (non metalated) | Sigma | 383805 | 0:30:70 |
| Nile Blue A Perchlorate | Aldrich | 37088 | 0:30:70 |

BA: 4-methoxybenzyl alcohol, Sigma, Cat. No. 136905-100G, Lot#MKBF6704V
IPA: Isopropyl Alcohol
Catalyst: OBPC + Mn, NB Ref 672-199

The chemiluminescent ink formulation typically includes a solvent. A suitable solvent for the ink formulation of the present invention is one that dissolves the catalyst and visible dye. In addition to dissolving the catalyst and the visible dye another consideration is the surface type wherein the chemiluminescent ink formulation will be applied. For example, membrane surfaces typically used in a Western blot or similar application includes nitrocellulose, PVDF, and the like. Certain solvents may affect these surfaces.

In addition to compatibility with membrane surfaces, the solvent may also be compatible with the other chemiluminescent ink formulation components. In certain applications, the solvent can be dissolved in a washing buffer(s) and the catalyst is deposited on the marked position(s) of the membrane. The ideal solvents include, but are not limited to, water, alcohols, esters, amines, amides, hydrocarbons, halogenated hydrocarbons, ketones, organic oxides or mixture thereof.

In certain instances, an alcohol is used such as aliphatic or aromatic alcohol. Typical alcohols include, but are not limited to, methanol, ethyl alcohol, propanol, and isopropyl alcohol, butanol, pentanol and the like. Aromatic alcohols include phenols, substituted phenols, benzyl alcohol, 4-methoxy benzyl alcohol, phenylethanol, phenoxyethanol, and the like. Other solvents include glycols, polyethylene glycols, polypropylene glycols, glycerol, esters such as ethyl acetate, butyl acetate, benzyl benzoate, ethers such as alkylene glycol alkyl ethers such as dipropylene glycol monomethyl ether, di-ethylene glycol mono-butyl ether, ketones such as acetone, methyl ethyl ketone, cyclic carbonates such as propylene carbonate, ethylene carbonate, aromatic and/or aliphatic hydrocarbons, vegetable or synthetic oils, DMF, dimethylacetamide, n-alkylpyrrolidones such as methylpyrrolidone, n-butylpyrrolidone or n-octylpyrrolidone, N-methylpyrrolidone, 2-pyrrolidone, 2,2-dimethyl-4-oxy-methylene-1,3-dioxolane and glycerol formal. Multiple solvents can be used. In certain aspects, the following solvents are used: water/aqueous buffer; methanol, ethanol, 1-pentanol, 1-butanol, 2-propanol, toluene, xylene, 4-methoxy benzyl alcohol.

In a chemiluminescent ink formulation application the solvent is dissolved entirely or partially in washing buffer(s) and the catalyst is deposited on the membrane. The catalytic property of phthalocyanine metal catalyst is ideal for this application.

A phthalocyanine metal catalyst is stable throughout the Western blot process. Metal complexed phthalocyanine metal catalysts produce light with a wide variety of substrates. Commercial substrates with high and low sensitivity can be used. For example, Thermo Scientific™ SuperSignal™ West Dura Substrate, which is a luminol-based HRP substrate can be used. In addition, Thermo Scientific™ SuperSignal™ West Pico Chemiluminescent Substrate can also be used. Those skilled in the art will know if other commercial HRP substrates that can be used.

The phthalocyanine metal catalyst is admixed with a substrate. The substrate is typically luminol, isoluminol or luminol derivative, together with an oxidizing agent, and a base. The oxidizing agent can be for example, a perborate or a peroxide. In certain instances, the substrate further comprises an enhancer. The enhancer is selected from the group consisting of sodium phenothiazine-10-yl-propylsulfonate (PTA), 2,2'Azino-bis[3-ethylbenzothiazoline-6-sulfonic acid] (ABTS), 4-(1,2,4-triazol-1-yl)phenol, 2-(1H-imidazole-2-yl)pyridine, 4-dimethylaminopyridine (DMAP), an azine, phenothiazine, phenoxazine and a combination thereof. Other enhancers are disclosed in U.S. Pat. Nos. 5,171,668, 6,432,662, and 7,803,573 the disclosures of which are hereby incorporated by reference.

In certain aspects, water solubility of the phthalocyanine metal catalyst is useful in determining suitability for use in a chemiluminescent ink formulation application. For example, a complex which is too hydrophilic will be removed by washing buffer and may cause the membrane to have high background.

In certain instances, the chemiluminescent ink formulation is disposed or filled in a writing implement such as "a pen" having a barrel comprising a reservoir. The chemiluminescent pen or "chemi-pen" has utility for marking the positions of standards or other annotations on immunoassays such as Western blot membranes and similar membrane surfaces which are exposed to a chemiluminescent substrate. The chemiluminescent pen can be used to mark experimental information such as a date, a name, a lane, a label, a lot number, a sample number and other appropriate information that is valuable for tracking and cross-referencing data in a scientific or diagnostic laboratory.

Prior to the advent of the present invention, annotations and/or marking the position of protein standards on a Western blot membrane were done using a Sharpie® or other indelible fine tip felt pen. One advantage of the chemiluminescent pen is that annotations are visible to the eye and the light produced when exposed to a chemiluminescent substrate is that the annotations are captured simultaneously with any chemiluminescent detection imaging system or film. In addition to a simple CCD imager, no other detector or camera is needed to visualize the visible dye.

In one aspect, the catalyst used to indicate the positions of pre-stained protein marker bands or other annotations on a Western blot membrane is applied at very low concentration such that it cannot be seen visually.

The ratio of the phthalocyanine metal catalyst to visible dye in a chemiluminescent ink formulation is about 1:10 w/w to about 10:1 w/w. In certain instances, the phthalocyanine metal catalyst to visible dye ratio is about 1:1; 1:2; 1:3; 1:4; 1:5; 1:6; 1:7; 1:8; 1:9 or 1:10 w/w. In still other instances, the phthalocyanine metal catalyst to visible dye ratio is about 10:1; 9:1; 8:1; 7:1; 6:1; 5:1; 4:1; 3:1; 2:1 or 1:1 w/w. In still other instances, the phthalocyanine metal catalyst to visible dye ratio is about 1:1 to about 1:3 w/w.

The amount of solvent in the formulation will depend on the phthalocyanine metal catalyst and the visible dye used. Typically, about 1 mL to 500 mL can be used. In other instances, about 1 mL to 25 mL, such as 1, 2, 3, 4, 5, 6, 7, 8, 9, 10, 11, 12, 13, 14, 15, 16, 17, 18, 19, 20, 21, 22, 23, 24, or 25 mL of solvent is used.

In one embodiment, the present invention provides a chemiluminescent pen, the chemiluminescent pen comprising:
   a barrel comprising a reservoir for holding a chemiluminescent ink formulation; and
   a nib.

In certain instances, the reservoir further comprises a fiber or filler to adsorb the chemiluminescent ink formulation.

FIG. 1 is one embodiment of a pen 100 of the present invention. As shown therein, the pen 100 has a barrel 110 comprising a reservoir for holding the chemiluminescent ink formulation. The barrel 110 may have fiber, filler or fabric contained therein to slowly release the chemiluminescent ink formulation adsorbed thereto. The ink can be adsorbed on fiber or filler and thereafter released. The ink or chemiluminescent ink formulation can be used to fill a reservoir or barrel. The barrel holds a reservoir and preferably ends in a nib 121 or point to dispense the liquid ink. The nib or point 121 can be fine to note protein marker-bands on a membrane that may be separated by only a few millimeters. The barrel containing the reservoir components are preferably compatible with solvents chosen for the ink formulation. In operation, the ink flows from the reservoir to a nib at a rate that allows a fine line on the membrane without spreading. In certain aspects, the barrel further comprises a cap 131. The cap is useful for closing the nib.

In certain other applications, a reservoir is used without fiber so the ink can flow quickly to the nib and thereafter to the membrane. To limit evaporation that results in the pen going dry, air tight seals or a cap can be used. The barrel can be loaded with about 1 mL to about 20 mL of ink formulation, such as 1, 2, 3, 4, 5, 6, 7, 8, 9, 10, 11, 12, 13, 14, 15, 16, 17, 18, 19 or 20 mL of ink. The ink can be placed in a pre-assembled pen and then capped.

The chemiluminescent pen allows for drawing or marking the transfer membranes in Western blots or other immunoassays. In addition, pre-stained protein standards can be used, and annotated. The chemiluminescent ink formulation adsorbs to nitrocellulose and PVDF membranes and reacts with peroxidase (e.g., HRP) substrates to produce chemiluminescence. The chemiluminescence can thereafter be detected.

The chemiluminescent ink formulation can be disposed or filled in a variety of reservoirs for different types of writing or printing such as ink-jet cartridges.

In certain aspects, the present invention provides a method for catalyzing a chemiluminescent reaction, the method comprising:
   admixing luminol, isoluminol or luminol derivatives with an oxidizing agent, a base and
   a chemiluminescent ink formulation to catalyze a chemiluminescent reaction and emit light.

The signal duration of the catalytic component of the chemiluminescent ink when exposed to a chemiluminescent substrate is an advantageous feature of the methods disclosed herein. Multiple phthalocyanine dyes e.g. phthalocyanine-3,4',4",4'''-tetrasulfonic acid and 1,4,8,11,15,18,22,25 Octabutoxy-29H,31H-phthalocyanine ("OBPC") can be complexed with a variety of metals (e.g. Fe, Co, Ni, Mn, Ru, and the like) for properties such as early signal intensity and total signal duration. The chemiluminescent pen can be used with low as well as high sensitivity chemiluminescent substrates with short or long duration. To avoid overexposure of film or saturated digital images, the signal should be intense in the short run and decrease over the long run. OBPC complexed with manganese is a preferred phthalocyanine metal catalyst of the present invention because of these properties.

Commercial substrates with high and low sensitivity can be used. For example, Thermo Scientific™ SuperSignal™ West Dura Substrate, which is a luminol-based HRP substrate can be used. In addition, Thermo Scientific™ SuperSignal™ West Pico Chemiluminescent Substrate can also be used. Other commercial HRP substrates can also be used.

The phthalocyanine metal catalyst is admixed with a substrate. The substrate is typically luminol or isoluminol, together with an oxidizing agent, and a base. The oxidizing agent can be for example, a perborate or a peroxide. In certain instances, the substrate further comprises an enhancer. The enhancer is selected from the group consisting of sodium phenothiazine-10-yl-propylsulfonate (PTA), 2,2'Azino-bis[3-ethylbenzothiazoline-6-sulfonic acid] (ABTS), 4-(1,2,4-triazol-1-yl)phenol, 2-(1H-imidazole-2-yl)pyridine, dimethylaminopyridine (DMAP), an azine, phenothiazine, phenoxazine and a combination thereof. Other enhancers are disclosed in U.S. Pat. Nos. 5,171,668, 6,432,662, and 7,803,573 the disclosures of which are hereby incorporated by reference.

In certain aspects, the present invention provides a chemiluminescence reaction method, the method comprising:

(i) contacting chemiluminescent ink formulation with a reaction mixture comprising luminol or isoluminol, an oxidant and a base to emit light;

(ii) detecting the emitted light; and (iii) optionally correlating the emitted light to the concentration of luminol, isoluminol or luminol derivative.

In certain aspects, the correlation can be used with a standard curve to ascertain the concentration of unknowns.

EXAMPLES

The following examples are offered to illustrate, but not to limit the claimed invention.

Example 1. Synthesis of Manganese 1,4,8,11,15,18,22,25-Octabutoxy-29H,31H-phthalocyanine 1,4,8,11,15,18,22,25-Octabutoxy-29H,31H-phthalocyanine (2 g, 1.8 mmol) and manganese(II) acetate tetrahydrate (2.2 g, 9.0 mmol) were heated at 60° C. in 1-butanol (100 mL) for 45 minutes. The reaction was cooled and then excess salts were removed by aqueous extractions. The organic layer was then dried over anhydrous sodium sulfate, filtered and dried to a dark red powder (2 g, 97%). The product was characterized using UV-VIS and light emission assays.

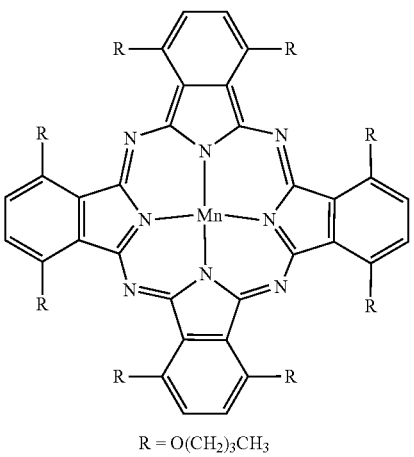

R = O(CH$_2$)$_3$CH$_3$

Example 2. Synthesis of Ruthenium phthalocyanine-3,4',4",4'''-tetrasulfonic Acid Phthalocyanine tetrasodium salt (1 gm) and ruthenium (III) chloride trihydrate were mixed in 20 mL of water and refluxed for 2 hours. The water was removed and separated by flash reverse C-18. The final product was 0.85 g of a green solid.

Example 3. Synthesis of Manganese phthalocyanine-3,4',4",4'''-tetrasulfonic Acid Manganese phthalocyanine-3,4',4",4'''-tetrasulfonic acid was prepared similarly according to procedure described in Example 2 and manganese chloride tetrahydrate was used in lieu of ruthenium(III) chloride trihydrate.

Example 4. Formulation of a Chemiluminescent Ink

To 1.5 g of 1,4,8,11,15,18,22,25-Octabutoxy-Phthalocyanine (OBPC) prepared as in Example 1, 3.0 g of Nile Blue A perchlorate (commercially purchased from Aldrich) is admixed. The structure of Nile Blue A perchlorate is shown below.

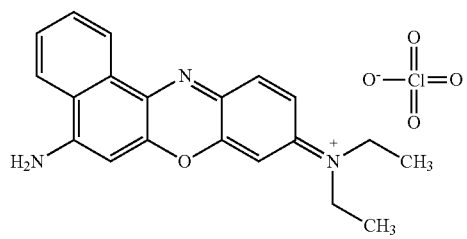

The mixture is sonicated overnight in 1 liter of a 30:70 mixture of toluene and isopropyl alcohol. The mixture is stirred continuously while reservoirs are loaded to yield a phthalocyanine ink formulation of the present invention.

Example 5. Dot Blot Test of Catalytic Activity on a Western Blot Membrane

The catalytic activity of the reagents ruthenium phthalocyanine-3,4',4",4'''-tetrasulfonic acid 210 and manganese phthalocyanine-3,4',4'',4'''-tetrasulfonic acid 255 were tested using a series of dot blots (FIGS. 2A and 2B). Both reagents were made as a saturated solution and a five-fold serial dilution of each was prepared. The samples were dotted neatly and in triplicate on nitrocellulose membrane (NCM). The membranes were washed with PBS and developed for 5 minutes with Thermo™ SuperSignal™ West Dura Chemiluminescent Substrate. Images were acquired immediately after incubation with substrate on LI-COR Odyssey Fc at 2 min exposure. The catalytic activity was robust for both compounds. No signal was detected in the blank spots 231. FIG. 2A shows that the ruthenium phthalocyanine metal catalyst was deposited at a high concentration 217, a medium concentration 221 and a low concentration 224. FIG. 2B shows that the manganese phthalocyanine metal catalyst was deposited at a high concentration 261, a medium concentration 271 and a low concentration 282. The blank 231 contained no catalytic reagent. For both compounds the chemiluminescence was highest at the highest concentration (217 and 261) deposited. Accordingly, the signals were decreased at the lower levels of the reagent.

Example 6. Slot Blot Test of Catalytic Activity on a Membrane

A saturated solution of ruthenium (III) phthalocyanine-3,4',4'',4'''-tetrasulfonic acid 310 and manganese phthalocyanine-3,4',4'',4'''-tetrasulfonic acid 320 in ultrapure water were painted onto nitrocellulose membranes to mimic the pattern of a pre-stained protein molecular weight marker. The membranes were washed with PBS and developed for 5 minutes with Thermo™ SuperSignal™ West Dura Chemiluminescent Substrate.

Figures 3A, 3B:
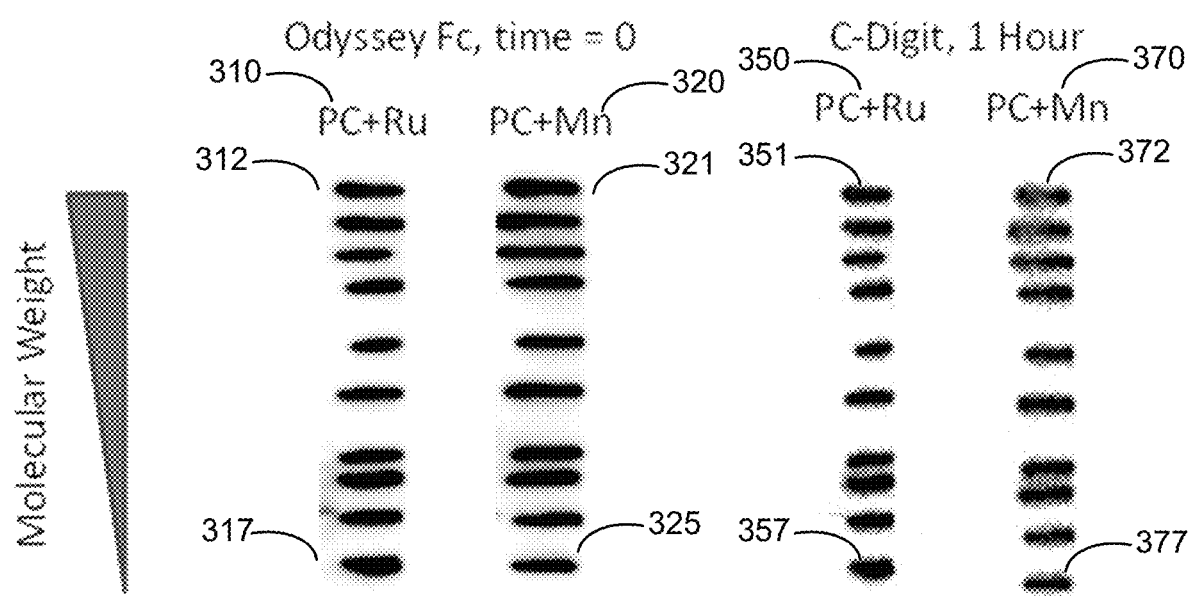
FIGS. 3A-3B illustrate the use of an embodiment of the present invention.

Images were acquired immediately after incubation with substrate on a LI-COR Odyssey Fc at 2 min exposure (FIG. 3A). The membrane deposited with ruthenium (III) phthalocyanine-3,4',4'',4'''-tetrasulfonic acid 310 produced a robust signal that resembled a protein molecular weight ladder with a highest molecular weight standard 312 and a low molecular weight standard 317. The membrane deposited with manganese phthalocyanine-3,4',4'',4'''-tetrasulfonic acid 320 also produced a robust signal that resembled a protein molecular weight ladder with a highest molecular weight standard 321 and a low molecular weight standard 325.

In a parallel experiment, images of the ruthenium phthalocyanine metal catalyst reagent and the manganese phthalocyanine metal catalyst reagent were acquired after a 1 hour exposure with substrate on a C-DiGit scanner (FIG. 3B). The ruthenium phthalocyanine metal catalyst reagent 350 generated a pattern that mimicked a protein ladder with a series of molecular weights ranging from highest 351 to lowest molecular weight 357. The manganese phthalocyanine metal catalyst reagent 370 generated a similar pattern of molecular weights ranging from highest 372 to lowest molecular weight 377. The robust signal was stable for greater than 1 hour at ambient temperatures. The slot blots demonstrate that the catalyst reagents are useful for marking membranes.

Example 7. Using the Chemiluminescent Pen in a Western Blot

Figure 4:
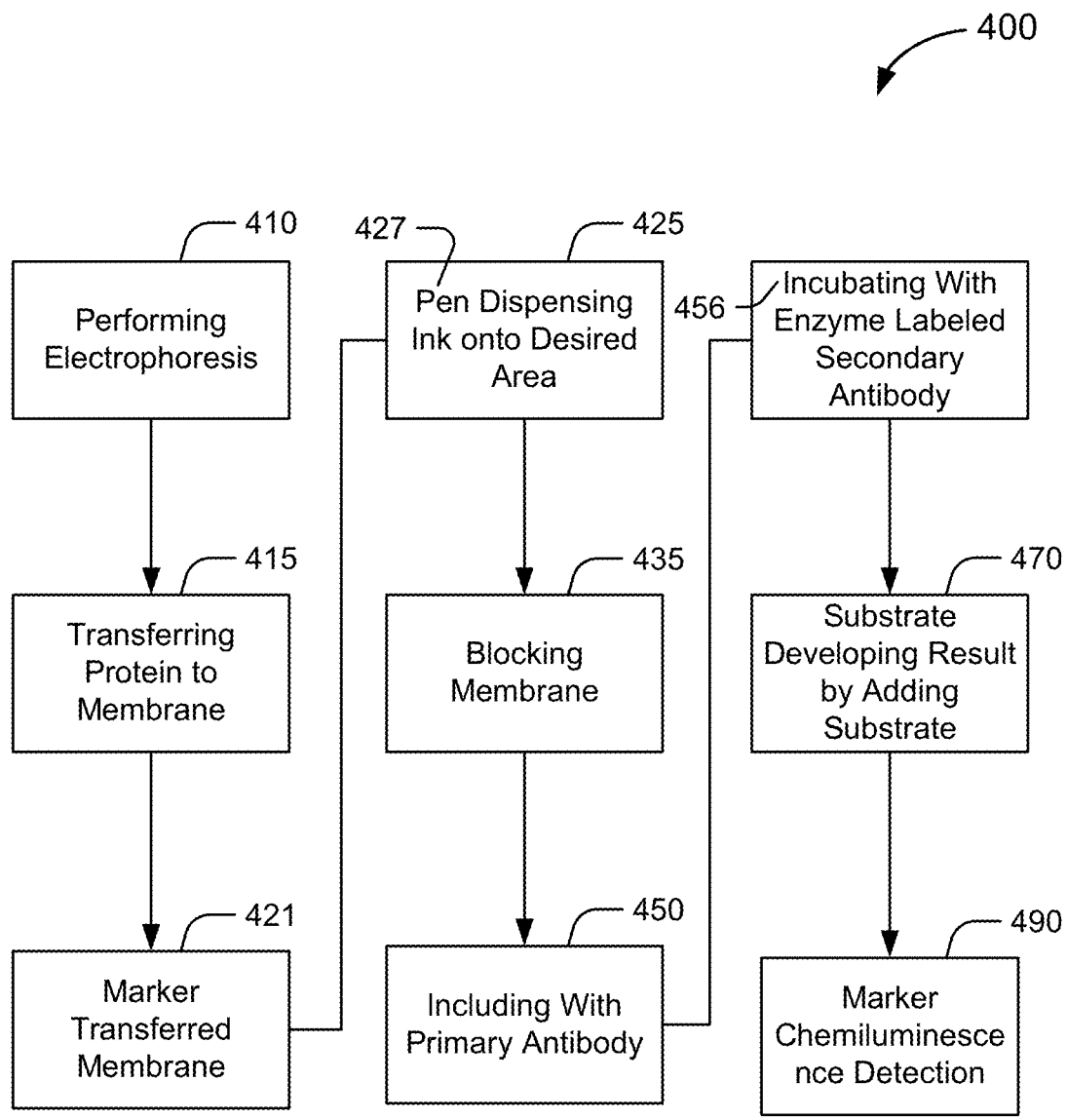
FIG. 4 illustrates a schematic diagram of an exemplary use of a Chemiluminescent pen of the present invention in Western blotting.

This example provides a diagram of an exemplary use of the chemiluminescent pen described herein. In particular, the example shows the use of the pen in Western blotting (FIG. 4). A sample such as a cell lysate sample is run on a polyacrylamide gel and the proteins are separated by gel electrophoresis 410. The proteins are transferred from the gel onto a membrane, such as a nitrocellulose membrane, PVDF membrane or nylon membrane, using standard wet or semi-dry transfer conditions 415. The transferred membrane contains the proteins from the gel including the protein molecular weight standard ladder 421. The chemiluminescent pen 427 is used to deposit the chemiluminescent ink onto the membrane, for example, to annotate a visible molecular weight ladder 425. The pen can be used to label or mark the membrane. In some embodiments, the chemiluminescent ink includes a visible dye that indicates the chemiluminescent markings on the membrane. The membrane is blocked 435 with a blocking solution such as 5% skim milk or BSA solution to prevent non-specific background binding of the primary or secondary antibodies to the membrane. The membrane 450 is incubated with primary antibodies to the protein(s) of interest. The membrane is incubated with a secondary antibody labeled with an enzyme, such as horseradish peroxidase (HRP) or alkaline phosphatase (AP) 456. A chemiluminescent substrate is incubated with the membrane 470. Emitted light from the chemiluminescent reaction is detected using an imaging system or X-ray film 490. For example, the protein ladder that was annotated using the chemiluminescent pen is visible on the film.

Example 8. Slot Blot Test of Catalytic Activity on the Membrane

This example illustrates the use of a chemiluminescent ink with substrates on a slot blot membrane (FIG. 5A-D). Manganese 1,4,8,11,15,18,22,25-Octabutoxy-29H,31H-phthalocyanine was made at a concentration of 1 mg/ml solution in 30/70 toluene isopropanol. The solution was tested similarly to the phthalocyanine metal catalyst reagent of Example 6. The chemiluminescent ink was deposited on four nitrocellulose membranes, such that each membrane contained two columns of six horizontal lines. The membranes were developed with either the Thermo Scientific™ SuperSignal™ Pico chemiluminescent substrate or the Thermo Scientific™ SuperSignal™ West Dura chemiluminescent substrate and imaged with either a LI-COR Odyssey Fc or a LI-COR C-DiGit scanner.

Figures 5A, 5B:
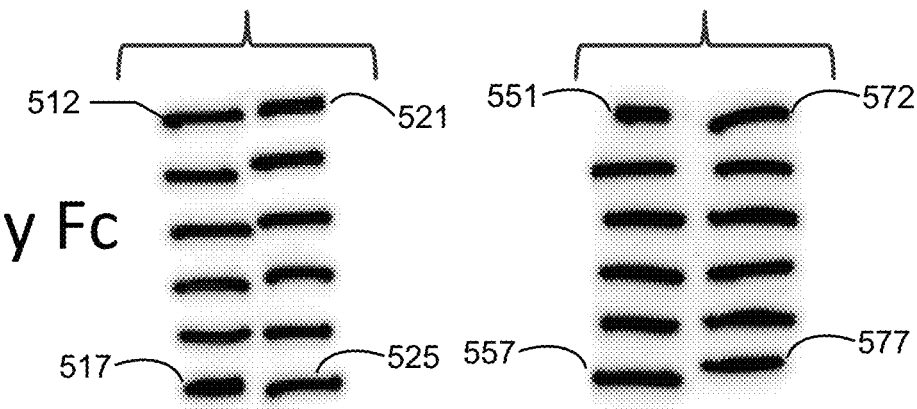
FIGS. 5A-5D illustrate the use of an embodiment of the present invention.
Figures 5C, 5D:
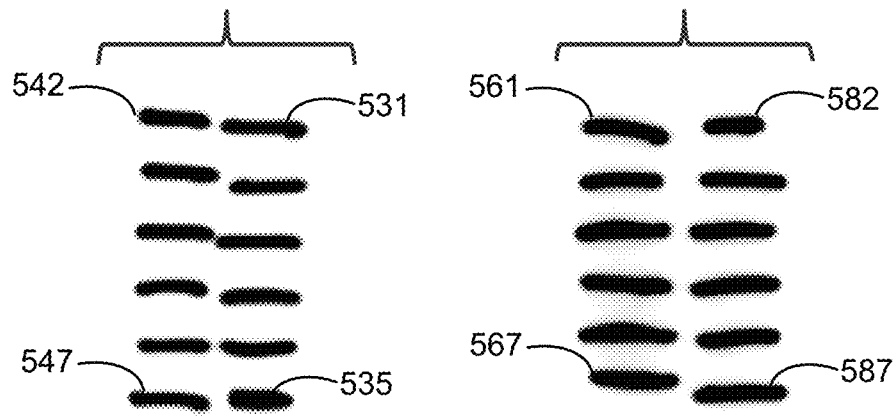

Membranes developed with Thermo Scientific™ SuperSignal™ Pico are shown in FIGS. 5A and 5C. Images acquired on a LI-COR Odyssey Fc showed detectable signals, e.g., 512, 517, 521 and 525. Images acquired on a LI-COR C-DiGit scanner also showed robust signals, e.g., 542, 547, 531 and 535.

Membranes developed with Thermo Scientific™ SuperSignal™ West Dura are shown in FIGS. 5B and 5D. The chemiluminescent ink produced robust marker lines, e.g., 551, 557, 572, and 577, as imaged by a LI-COR Odyssey Fc. Bold marker lines, e.g., 561, 567, 582, and 587, were also visible using a LI-COR C-DiGit scanner.

Example 9. Storage Stability of Phthalocyanine Metal Catalyst

Figure 6:
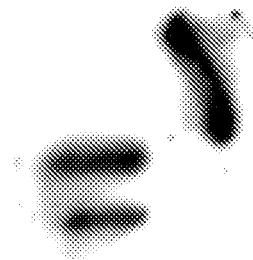
FIG. 6 illustrates the use of an embodiment of the present invention.

Manganese phthalocyanine-3,4',4'',4'''-tetrasulfonic acid in ultrapure water was marked onto a nitrocellulose membrane. The chemiluminescent ink was used to pen the terms "LI-COR" and "Exp4." A pattern similar to that of a pre-stained protein molecular weight ladder was also marked on the membrane. The membrane was stored on the bench top for 1 week at ambient temperature exposed to light. After 1 week, Thermo™ SuperSignal™ West Dura substrate was added and the membrane was imaged on a LI-COR Odyssey® Fc (FIG. 6). The marking on the membrane were clearly visible after the chemiluminescent reaction. Thus, the phthalocyanine metal catalyst reagent was stable even after a one-week exposure to ambient temperature and light.

Example 10. Comparison of Chemiluminescent Pen and Advansta ChemiPen Signals on PVDF and Nitrocellulose Membranes This example compares the performance of the chemiluminescent pen described herein to the Advansta ChemiPen on PVDF and nitrocellulose membranes.

The PVDF membranes were wet with methanol and rinsed with 1×PBS. Excess PBS was drained from the membranes (semi-Dry) and the membranes were marked with either the Advansta ChemiPen (Advansta, Menlo Park, Calif.) or the chemiluminescent Pen (LI-COR).

The nitrocellulose membranes were wet with 1×PBS. Excess PBS was drained from the membranes (semi-dry) and the membranes were marked with either the Advansta ChemiPen or LI-COR's chemiluminescent Pen.

PVDF and nitrocellulose membranes were marked multiple times (Heavy=over and over, back and forth) or once (Light=single pen stroke). The marking process was repeated on dry (not pre-wet) membranes. The membranes were incubated with 5% skim milk in 1×PBS and washed extensively with PBST (PBS plus 0.1% Tween 20) followed by PBS. Thermo™ SuperSignal™ West Dura substrate was added and the membranes were imaged on a LI-COR Odyssey® Fc for 2 min immediately after substrate addition (Time 0) or after one hour (Time 1 hr) following substrate addition.

Figures 7A, 7B:
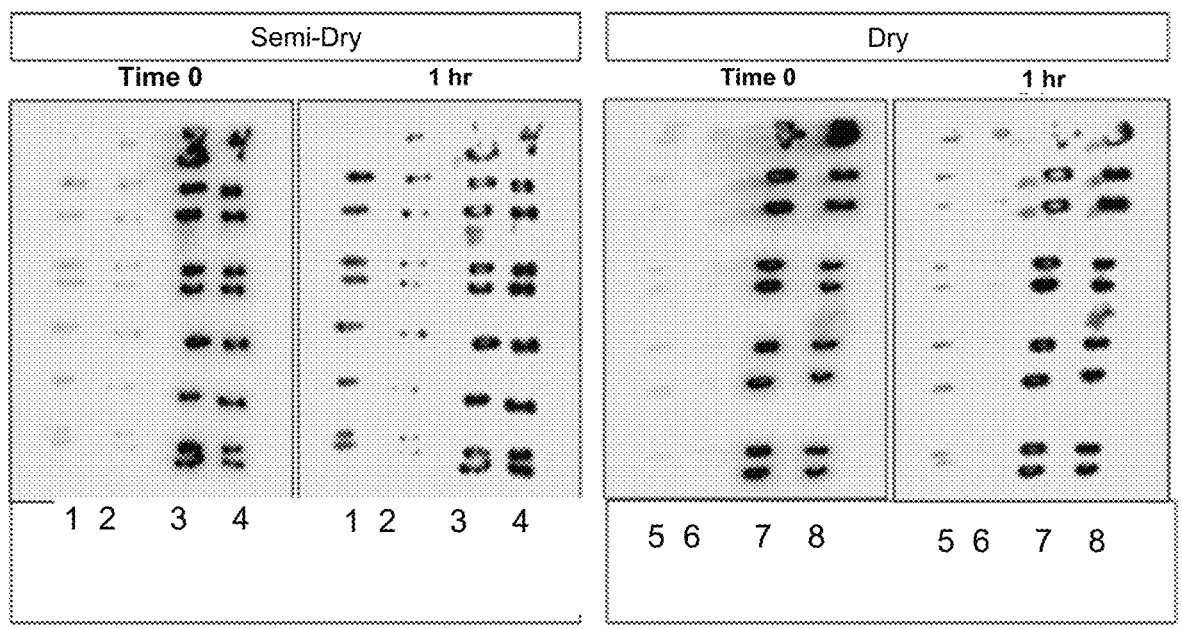
FIGS. 7A-7D illustrates the use of an embodiment of the present invention.

FIG. 7A shows markings with the Advansta ChemiPen (lanes 1 and 2) and with LI-COR's chemiluminescent Pen (lanes 3 and 4) on the semi-dry PVDF membrane. FIG. 7B shows markings with the Advansta ChemiPen (lanes 5 and 6) and with LI-COR's chemiluminescent Pen (lanes 7 and 8) on the dry PVDF membrane. LI-COR's pen produced darker lines on the PVDF membrane compared to the Advansta ChemiPen in all conditions tested.

Figures 7C, 7D:
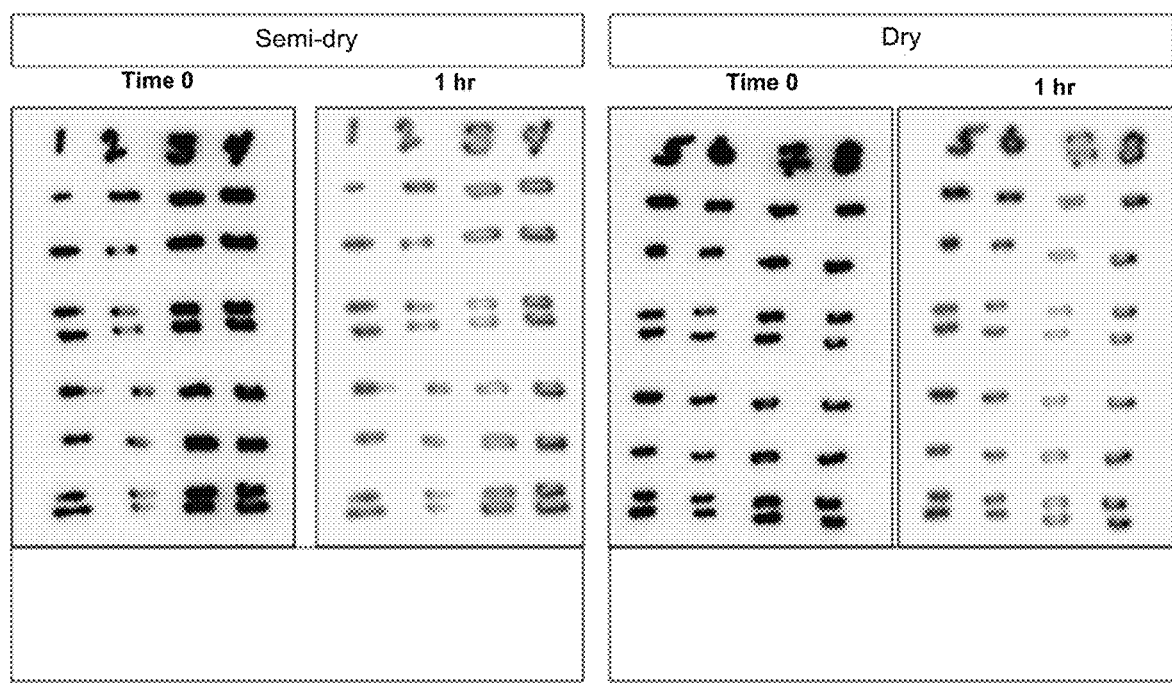

For the nitrocellulose membrane, the pen markers were darker when the membrane was imaged immediately after the substrate was incubated with the membrane (FIGS. 7C and 7D). On semi-dry nitrocellulose membrane LI-COR's chemiluminescent ink generated more robust lines (lanes 3 and 4) compared to Advansta's pen (lanes 1 and 2). On dry nitrocellulose, both pens produced markings of similar intensity (FIG. 7D).

Figure 8:
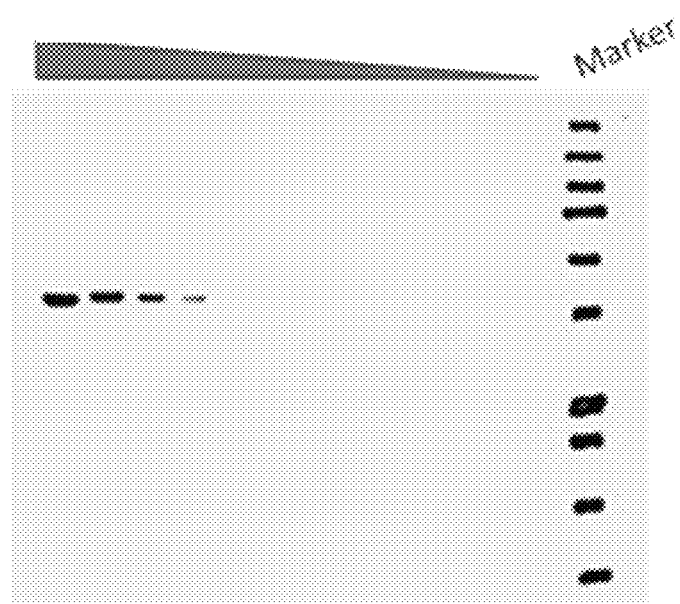
FIG. 8 illustrates the use of an embodiment of the present invention. The image shows the annotated protein ladder in the right lane using the pen of the present invention and different levels of Erk protein.

Example 11. Chemiluminescent Pen Used to Mark the Protein Standards on a Western Blot This example illustrates the use of the chemiluminescent pen on a Western blot for Erk protein. Serial dilutions of NIH/3T3 cell lysate were separated by SDS-PAGE and transferred to a nitrocellulose membrane. After transfer, the positions of the pre-stained protein molecular weight marker ("Marker") bands were annotated using the of the present invention. The membrane was subsequently blocked with 5% skim milk in PBS and further processed according to a standard Western blotting method. The primary antibody was an anti-Erk monoclonal antibody and the secondary antibody was a horseradish peroxidase conjugated goat anti-mouse secondary antibody. The membrane was washed with PBST and PBS. Thermo™ SuperSignal™ West Dura substrate was added and the membrane was imaged on a LI-COR Odyssey® Fc for 2 min immediately after substrate addition. The image (FIG. 8) shows the annotated protein ladder in the right lane and different levels of Erk protein.

Example 12. The Synthesis of 2,9,16,23-Tetra-tert-butyl-29H,31H-phthalocyanine Manganese 2,9,16,23-Tetra-tert-butyl-29H,31H-phthalocyanine manganese is made similarly as described in Example 1 except by using 2,9,16,23-Tetra-tert-butyl-29H,31H-phthalocyanine (Aldrich, catalog #423157) as starting material.

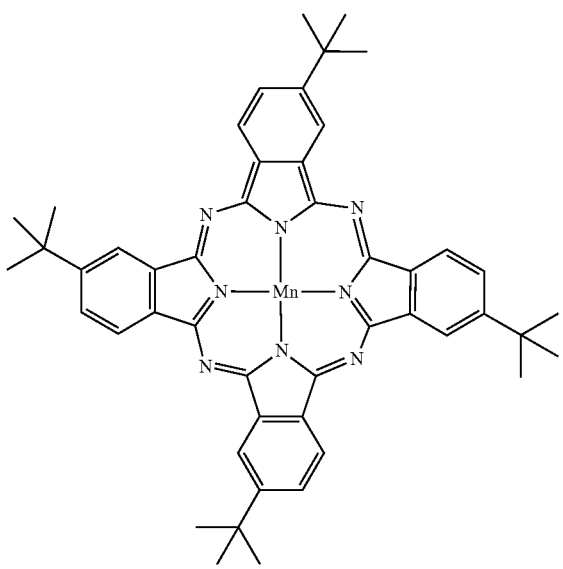

Example 13. The Synthesis of Tetra-Tetraethyleneglycol Monomethyl Ether Phthalocyanines Manganese

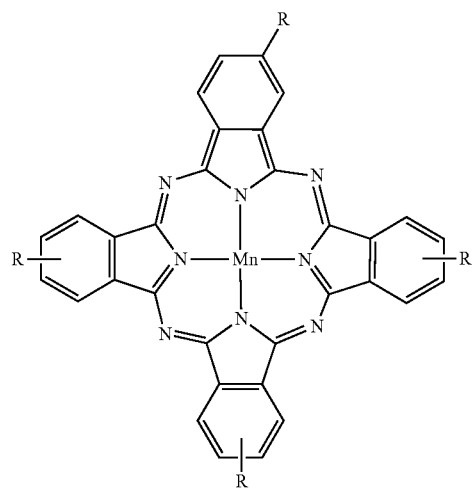

$R = O(CH_2CH_2O)_4H$

A mixture of 4-(monomethyl ether Tetraethyleneglycol phthalonitrile (0.52 g, 1.79 mmol), and $MnCl_2 \cdot 4H_2O$ (1.08 g, 5.38 mmol) in n-pentanol (20 mL) is heated to 100° C., and then a small amount of DBU (1 mL) is added. The mixture is stirred at 140-150° C. for 24 h. After a brief cooling, the volatiles are removed under reduced pressure. The residue is dissolved in CHCl$_3$ (150 mL) and then filtered to remove part of the MnPc formed. The filtrate is collected and evaporated to dryness in vacuo. The residue is purified by silica gel column chromatography using CHCl$_3$ and then CHCl$_3$/MeOH (100:1 v/v) as the eluents. The crude product is purified by size exclusion chromatography using THF as the eluent, followed by recrystallization from a mixture of CHCl$_3$ and hexane to give a green solid.

Example 14. The Synthesis of 2(3),9(10),16(17),23(24)-Tetrakis(α/β-D-galactopyranosyl-oxy) phthalocyaninato Manganese

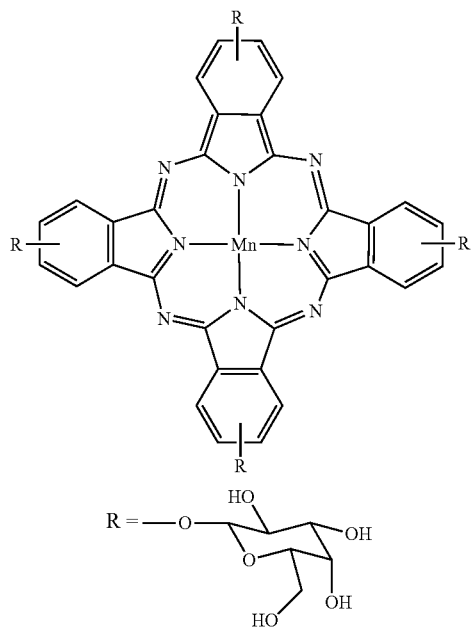

To 4-(D-glucopyranosyloxy)-1,2-Benzenedicarbonitrile (3.25 g, 1.06 mmol) dissolved in a mixture of 2-(dimethylamino)ethanol (10 mL) and n-butanol (5 mL) is added manganese chloride tetrahydrate (2.33 g, 10 mmol). The mixture is stirred under argon for 24 h at 100° C. and concentrated in vacuo. The residue is then dissolved in a minimal amount of H$_2$O and crude product was precipitated by addition of acetone. The solid is filtered, redissolved in a minimal amount of H$_2$O, precipitated a second time by addition of acetone, and collected by filtration. Purification was achieved by flash RP(C18) chromatography (H$_2$O-MeCN, 10:1) to afford 1 as a green solid (1.40 g, 10%).

It is understood that the examples and embodiments described herein are for illustrative purposes only and that various modifications or changes in light thereof will be suggested to persons skilled in the art and are to be included within the spirit and purview of this application and scope of the appended claims. All publications, patents, and patent applications cited herein are hereby incorporated by reference in their entirety for all purposes.

What is claimed is:

1. A chemiluminescent pen, the chemiluminescent pen comprising:

a barrel comprising a reservoir for holding a chemiluminescent ink formulation;

and a nib, wherein the ink formulation comprises a phthalocyanine metal catalyst at a range from 0.0024 to 1.5 mg/mL, wherein the metal is a member selected from the group consisting of Ni, Mn, Fe, Co, and Ru;

a visible dye, other than the phthalocyanine metal catalyst, wherein the visible dye provides visible orientation for the phthalocyanine metal catalyst, and wherein the phthalocyanine metal catalyzes a chemiluminescent reaction of luminol, isoluminol or luminol derivatives with an oxidizing agent.

2. The chemiluminescent pen of claim 1, wherein the reservoir further comprising a fiber to adsorb the chemiluminescent ink formulation.

3. The chemiluminescent pen of claim 1, wherein the barrel further comprising a cap.

4. The chemiluminescent pen of claim 1, wherein the phthalocyanine metal catalyst has the formula:

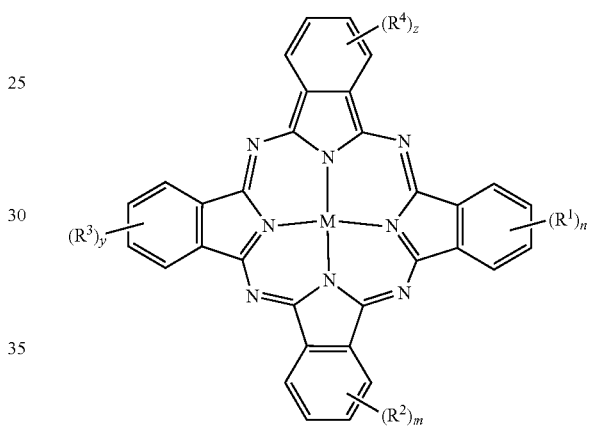

wherein M is a member selected from the group consisting of Ni, Mn, Fe, Co, and Ru;

R$^1$, R$^2$, R$^3$ and R$^4$ are each independently selected from the group consisting of hydrogen, amino, amido, alkyl, alkenyl, alkoxy, carboxyl, cyano, halo, hydroxyl, sulfonato, phospho, hydroxyalkyl, alkoxyalkyl, aminoalkyl, amidoalkyl, alkylthioalkyl, carboxyalkyl, alkoxycarbonylalkyl, sulfonatoalkyl, alkoxycarbonyl, and alkoxyalkyl, a sugar residue, a polysaccharide residue, and a PEG; and m, y, z and n are each independently selected from the group consisting of 0, 1, 2, 3 and 4.

5. The chemiluminescent pen of claim 4, wherein M is Mn.

6. The chemiluminescent pen of claim 4, wherein M is Ru.

7. The chemiluminescent pen of claim 4, wherein R$^1$, R$^2$, R$^3$ and R$^4$ are each alkoxy.

8. The chemiluminescent pen of claim 4, wherein m, y, z and n are each 2.

9. The chemiluminescent pen of claim 1, wherein the visible dye is a member selected from the group consisting of Solvent Green, Sudan Blue, Safranin, 1-(methylamino)anthraquinone and Nile Blue A.

10. The chemiluminescent pen of claim 9, wherein the visible dye is Nile Blue A.

11. The chemiluminescent pen of claim 1, wherein the chemiluminescent ink formulation comprises a solvent which is a member selected from the group consisting of water, an alcohol, an ester, an amine, an amide, a hydrocarbon, a halogenated hydrocarbon, a ketone, an organic oxide and a mixture thereof.

12. The chemiluminescent pen of claim 11, wherein the solvent is a mixture of an alcohol and a hydrocarbon.

13. The chemiluminescent pen of claim 11, wherein the solvent is a mixture of toluene and isopropyl alcohol.

14. A chemiluminescent pen, the chemiluminescent pen comprising:
- a barrel comprising a reservoir for holding a chemiluminescent ink formulation; and a nib, wherein the ink formulation comprises a solvent and a phthalocyanine metal catalyst at a range from 0.0024 to 1.5 mg/mL, wherein the metal is a member selected from the group consisting of Ni, Mn, Fe, Co, and Ru;
- a visible dye, other than the phthalocyanine metal catalyst, wherein the visible dye provides visible orientation for the phthalocyanine metal catalyst, and wherein the phthalocyanine metal catalyzes a chemiluminescent reaction of luminol, isoluminol or luminol derivatives with an oxidizing agent, wherein the solvent is a mixture of an alcohol and a hydrocarbon.

* * * * *